Nov. 3, 1970   O. L. WELKER   3,538,410
STARTING CONTROL FOR ELECTRIC MOTOR
Filed Jan. 26, 1968   2 Sheets-Sheet 1
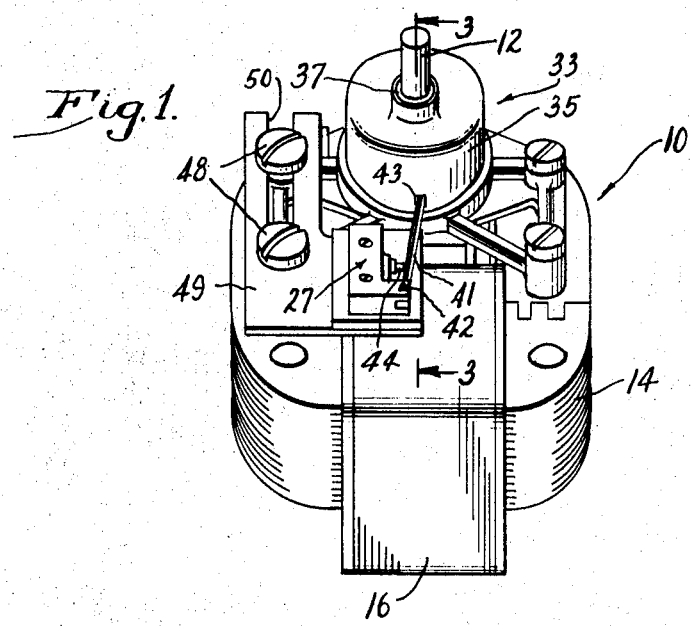
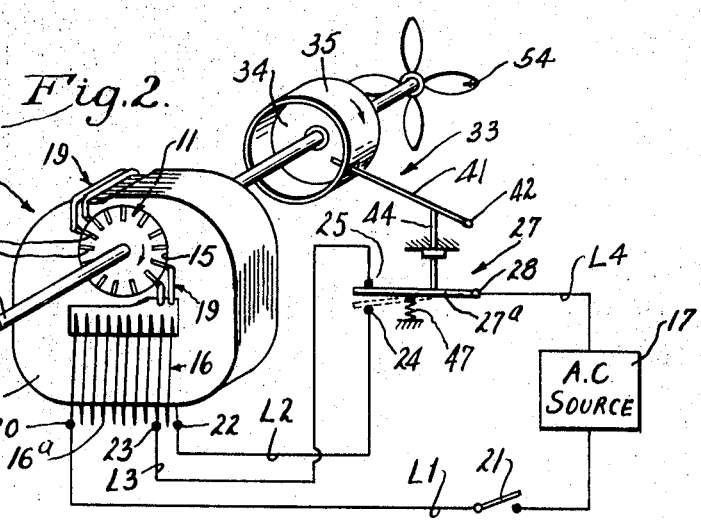
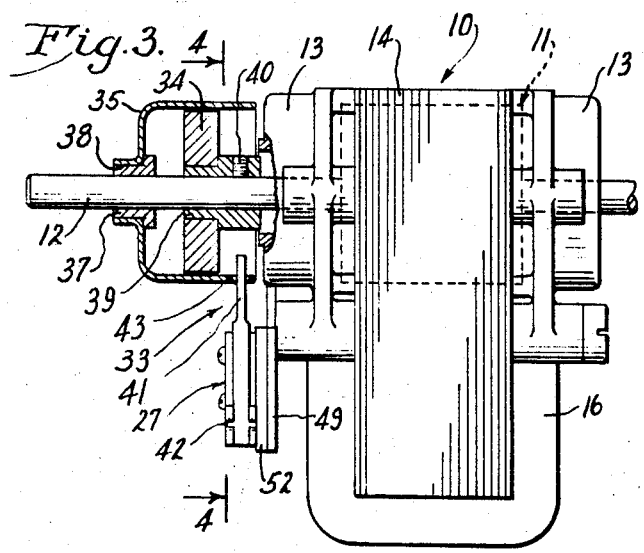
INVENTOR.
Oscar L. Welker
BY Wolfe, Hubbard,
Voit & Osann
ATTORNEYS INVENTOR.
Oscar L. Welker
BY Wolfe, Hubbard,
Voit & Osann
ATTORNEYS United States Patent Office 3,538,410
Patented Nov. 3, 1970

3,538,410
STARTING CONTROL FOR ELECTRIC MOTOR
Oscar L. Welker, Rockford, Ill., assignor to Barber-Colman Company, Rockford, Ill., a corporation of Illinois
Filed Jan. 26, 1968, Ser. No. 700,895
Int. Cl. H02p 1/44
U.S. Cl. 318—221                                    15 Claims

ABSTRACT OF THE DISCLOSURE

A shaded-pole electric motor of basically conventional form including a rotor and a stator carrying the primary winding and the shading means, combined with a starting control including a tap for applying the source voltage selectively to all or part of the winding through a two-position switch. In the first form, the switch is operated by a centrifugal speed sensor comprising a disk magnet on the output shaft, a nonmagnetic drag cup telescoped over the magnet and journaled on the shaft, an operating lever abutting against the cup and adapted to be rocked about its fulcrum by the cup, and the spring-loaded button of the switch, the button abutting against the lever between its ends. For adjustment of the motor speed at which the drag cup actuates the switch, the lever is adjustable longitudinally relative to the cup to vary its effective length. A second operator uses an auxiliary coil placed in slots in the stator adjacent to the air gap such that its axis is in quadrature with the axis of the main field flux of the motor to produce a voltage signal indicative of the motor speed, the signal being applied to the gate of a silicon-controlled rectifier which is triggered at a selected speed to energize a relay coil and operate the switch. In each case, the motor starts with excessive current and high torque, and then is shifted to normal running conditions after a selected speed is attained.

BACKGROUND OF THE INVENTION

This invention relates to the control of electric motors and, more particularly, to the starting torque developed by single-phase induction motors of the type known as shaded-pole motors. In general, such motors consist of a cylindrical rotor carrying conductors in slots in its outer periphery to form a secondary winding, and an encircling stator in the form of a core carrying a primary winding adapted to be connected to a source of alternating current to create a revolving magnetic field cutting the secondary conductors to induce line-frequency currents therein. The result is the creation of two equal and oppositely revolving fields of flux around the rotor. To develop starting torque, a short-circuited shading coil is placed in the stator at a preselected electrical angle from the primary winding to create an induced current damping the reverse flux field to produce a net forward field capable of starting the motor.

This type of motor is characterized by its simplicity, low cost, and torque, and is used in relatively small sizes for light loads. One application is the driving of rubber paper-feed and transport rollers in office copying machines. It has been found, however, that a motor of adequate size to provide sufficient running torque for such rollers often does not develop sufficient starting torque to start the rollers after they have been stationary for a substantial period of time and have become flattened along the line of engagement.

SUMMARY OF THE INVENTION

The primary object of the present invention is to increase the starting torque of a shaded-pole electric motor of a given size above that normally developed by the motor to enable the motor to overcome a greater initial load, and to accomplish this in a relatively simple and inexpensive manner while preserving adequate running torque to drive the load after it has been started. A more specific object is to control the excitation of the primary winding to produce a temporary increase in starting current, and therefore in flux and the resulting torque, during starting and to shift to running conditions automatically after the motor has overcome the initial load. Other objects are to obtain the increased starting torque simply and inexpensively with the same voltage and basic components used during running; to change to the running condition in response to the attainment of a preselected speed; and to accomplish the changeover from the starting condition to the running condition either with a compact and simple mechanical control device or with a novel electrical control utilizing an auxiliary quadrature winding in the motor to signal the attainment of the selected changeover speed and initiate the change.

Other objects and advantages of the invention will become apparent from the following detailed description, taken in conjunction with the accompanying drawings.

BRIEF DESCRIPTION OF THE DRAWINGS

FIG. 1 is a perspective view of a shaded-pole electric motor equipped with a control embodying the novel features of the present invention.

FIG. 2 is a schematic perspective view of the motor of FIG. 1 with the basic elements of the control shown diagrammatically and in the motor-starting condition.

FIG. 3 is a side elevational view of the motor of FIG. 1 partly in cross-section taken substantially along line 3—3 of FIG. 1.

DESCRIPTION OF THE PREFERRED EMBODIMENT, FIGS. 1–4

Figure 4:
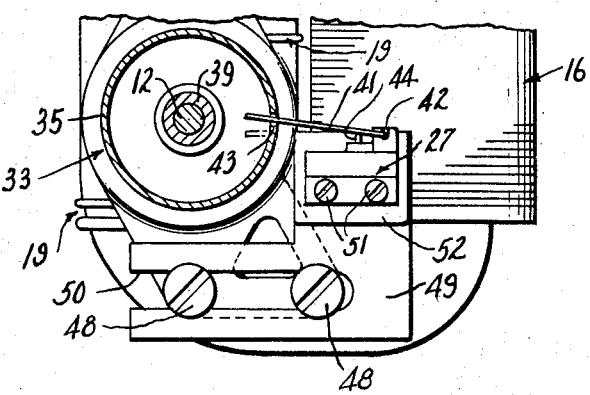
FIG. 4 is a fragmentary cross-sectional view taken substantially along the line 4—4 of FIG. 3.

As shown in the drawings for purposes of illustration, the invention is embodied in a shaded-pole motor 10 generally comprising a cylindrical rotor 11 fast on an output shaft 12 journaled in the motor in suitable bearings at 13 (FIG. 3) at the opposite ends of the rotor, and a stator 14 having a cylindrical opening 15 in which the rotor is disposed. Wrapped around a portion of the stator is a primary winding 16 having a preselected number of turns, for example 284, for connection to a source 17 (FIG. 2) of alternating current voltage, and embedded in the periphery of the rotor are a plurality of angularly spaced, short-circuited conductors 18 forming the secondary winding of the motor.

When the exciting voltage is applied to the primary winding 16, the alternating current that flows in the winding produces a rotating magnetic field around the rotor 11 with lines of flux intersecting the conductors 18 to induce alternating currents therein by transformer action, and the interaction between the induced rotor currents and the stator field produces torque. A single-phase induction motor such as this, however, has a pulsating field that may be resolved into equal forward and backward fields, each with half the peak magnitude of the pulsating field, and thus has no tendency to start unless one of the fields is suppressed or modified. For this purpose, a permanently short-circuited winding or coil 19 is placed in the stator 14 in selected positions to reduce the magnitude of the reverse flux and cause it to lag in time phase. Accordingly, the field in the annular air gap around the rotor has an undamped forward flux and a damped reverse flux, resulting in a net forward torque for starting the motor.

Shaded-pole motors characteristically develop relatively low torque and are used to drive light loads such as fans and the like. As previously stated, one use for such motors is the driving of the rubber paper-feed rollers (not shown) of office copying machines. A problem that has been encountered in this area is the starting of the rollers after they have been stationary for a period of time and have flattened along the line of contact. Under these circumstances, a motor large enough to continue driving the rollers once they are started may not develop enough torque to overcome the initial, somewhat greater, resistance of the rollers during starting, and it has been necessary in some instances to use over-size motors simply to obtain the necessary starting torque.

In accordance with one aspect of the present invention, the starting torque of the motor 10 is increased above the rated torque level by temporarily increasing the exciting current in the primary winding 16 beyond the safe steady-state level and correspondingly increasing the intensity of the flux field created by the winding, and maintaining the increased current level only until the motor has attained a speed indicating that the initial load resistance has been overcome and the higher torque no longer is needed. To these ends, the exciting voltage initially is applied to a portion 16$^a$ of the winding less than the full number of turns and having an impedance materially less than the impedance of the full winding, whereby the current produced in the partial winding is substantially greater than the current for which the motor is designed. After the load begins to move, and before the excessive current can overheat and damage the motor, the exciting voltage is switched to the full winding to reduce the current to within the safe-rated range and restore the motor to the normal running condition with a lower torque that is adequate to continue driving the load. In this manner, the output of the motor is temporarily boosted although only the existing basic motor components and the normal exciting voltage are used.

In this instance, the illustrative 284-turn primary winding 16 is tapped to apply the source voltage to, for example, only 215 turns during starting, in the manner shown schematically in FIG. 2. One end 20 of the coil is connected by a power line L1 to one input terminal of the source, through a start switch 21, and the other end 22 of the coil is connected to a line L2 paralleling a tap line L3 connected to an intermediate point 23 that is 215 turns from the coil end 20. The two parallel lines lead to the two contacts 24 and 25 of a two-position switch 27 having an arm 27$^a$ (FIG. 2) pivoted at 28 for swinging between the positions indicated in full and broken lines in FIG. 2. Through this arm, one or the other of the contacts is connected to the other source terminal through a power line L4 to apply the source voltage either to the full winding 16 or to the tapped portion 16$^a$.

Other factors being equal, the torque of a shaded-pole motor is proportional to the product of the current in the primary winding and the number of turns of the winding, and the current level is determined by the applied voltage and the impedance of the full circuit. When the number of turns is reduced, however, the same applied voltage produces a disproportionately greater current with a resulting increase in the flux density of the field and the torque output of the motor. Specifically, it has been observed that the application of 115 volts A.C. to only 215 of the full 284 turns of a Barber-Colman shaded-pole motor, Model Dyar 878-2, approximately doubles the exciting current and produces a starting torque on the order of fifty percent higher than the normal torque, and that proportionally higher torque is maintained while the motor accelerates. The graph shown in FIG. 5 shows the normal current curve at 29, the higher starting-current curve at 30, and the corresponding speed curves at 31 and 32, from which the torque levels during acceleration may be determined.

Figure 5:
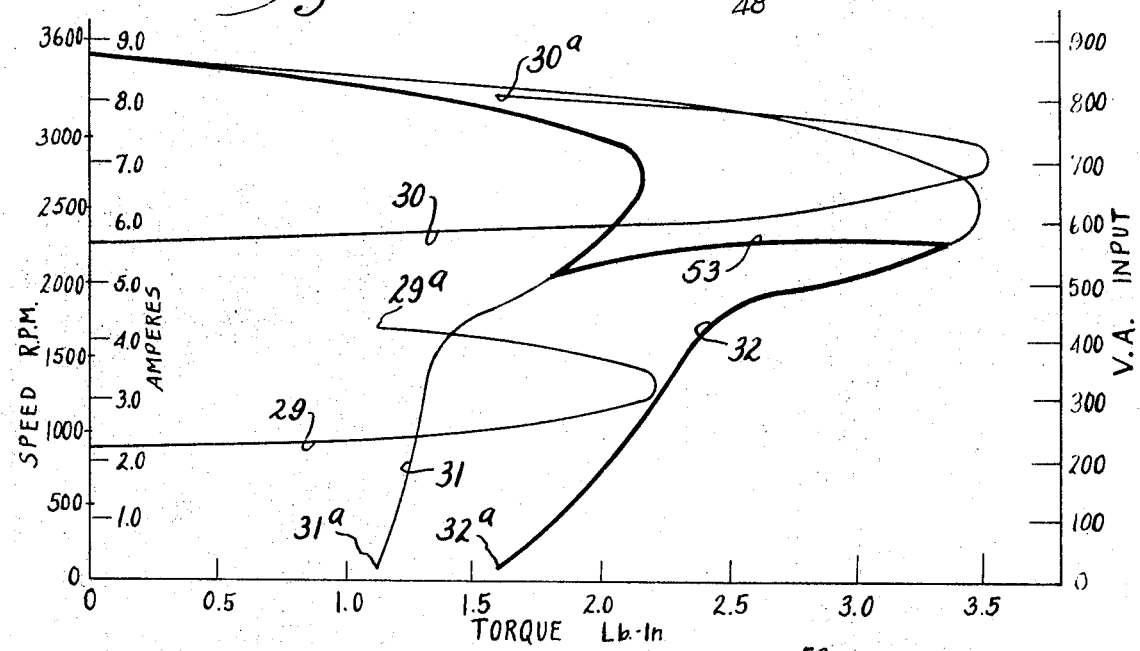
FIG. 5 is a graph showing variations in current and speed in relation to the torque of the motor during starting and acceleration.

When the exciting voltage is applied to the full winding 16 during starting, the initial current input, as indicated at 29$^a$ in FIG. 5, is approximately 4.5 amperes and the initial torque is approximately 1.15 lb.-in. as indicated at 31$^a$. When the same voltage is applied to the partial winding 16$^a$, the initial current input 30$^a$ is nearly 9 amperes and the corresponding torque 32$^a$ is approximately 1.65.-in. It will be appreciated that the numerical values used in preparing the graph are merely illustrative and should not be considered as limiting in any way, the present invention being applicable to motors of various sizes.

To control the position of the switch arm 27$^a$ in accordance with the operating condition of the motor 10, a switch operator 33 is incorporated in the control to maintain the switch arm in the first or starting position (shown in full lines in FIG. 2) while the motor is starting and accelerating from zero (stall) to a selected speed level, and to move the switch arm to the second position (shown in broken lines) automatically for reduction of the current and torque level before the excessive starting current can heat the motor to the danger point. While this operator may take various forms, the preferred form shown in FIGS. 1–4 comprises a mechanical speed-responsive device of inexpensive and compact construction for effectively sensing the motor speed and changing the switch position at a preselected speed level to change from the starting condition to the running condition.

Herein, the switch operator 33 includes a disk-shaped permanent magnet 34 (FIG. 3) composed of conventional ceramic magnet material and coaxially mounted on and rotating with the output shaft 12 of the motor 10. A cup-shaped member 35 composed of nonmagnetic material such as aluminum is telescoped over the magnet and supported on the shaft by a bearing 37 (FIGS. 1 and 3) pressed into a flanged opening 38 in the bottom of the cup and rotatable about the shaft so that the cup is supported to turn relative to the shaft. The magnet is fast on a collar 39 clamped on the shaft by a set screw 40, and is slightly smaller in outside diameter than the inside diameter of the cup so that the periphery of the magnet rotates in close proximity to the cup and the flux lines surrounding the magnet intersect the cup. This sets up eddy currents in the cup, and the eddy currents interact with the field of the magnet to produce a rotational force tending to drag the cup with the magnet about the axis of the shaft 12. This force is generally proportional to the rate of rotation of the magnet, and thus is proportional to the speed of the motor.

A lever 41 is pivoted on the motor at 42 beside the drag cup 35 and extends generally radially into the cup through an aperture 43 therein so that clockwise rotation (FIG. 1) of the cup tends to rock the lever to the left. Adjacent the left side of the intermediate portion of the lever is a button 44 constituting the actuator of the switch 27, the button being movable inwardly against the action of a spring 47 (FIG. 2) to shift the switch arm 27$^a$ from the first position to the second position. Thus, the switch spring acts through the lever 41 to oppose clockwise rotation of the cup beyond the position in which the lever engages the button 44, and the switch arm 27$^a$ is held in the first position when the motor is stopped or is running at a speed lower than the selected change-over speed.

Accordingly, the initial excitation of the primary winding 16, when the start switch 21 is closed, is through lines L1 and L3 for applying the source voltage to the tapped portion 16$^a$ of the winding. Thus, the exciting current follows the higher curve 30 in the graph in FIG. 5 with the initial boosted torque and speed levels indicated at 32$^a$. At the same time, the permanent magnet 34 begins to turn within the cup 35, producing the eddy currents which interact with the field of the magnet to create the drag force proportional to the speed of rotation of the magnet and acting upon the free end portion of the operating lever 41 to urge the latter against the actuating button 44. So long as the resistance of the spring 47 is greater than the force applied through the lever to the button, the switch arm 27a remains in its first position and the motor continues to accelerate in the starting condition.

By proper selection of the spring 47, the control can be adapted to actuate the switch 27 at any selected speed level of substantial magnitude. To facilitate the selection of this speed level, and also for adjustment of the level in service use, the operating lever 41 is adjustably mounted on the motor 10 for movement toward and away from the cup 35 to vary the effective length of the lever and thereby change the magnitude of the force resisting movement of the cup. In other words, adjustment of the position of the lever varies the mechanical advantage with which the drag force is applied to the spring. For this purpose, the housing of the switch is mounted on the motor by means of a bracket 49, herein an L-shaped plate shown most clearly in FIGS. 1 and 4, fastened to the motor by screws 48 extending through an open-ended slot 50 that is elongated generally longitudinally of the operating lever. The latter is mounted on the switch housing by means of studs (see FIG. 3) near the end of the arm forming the fulcrum 42 and extending laterally into recesses formed by forked projections on the housing receiving the studs with a snap fit. The entire switch assembly is held on the adjustable bracket by screws 51 with an insulating pad 52 clamped between the assembly and the bracket. Thus the bracket, the switch, and the lever are adjustable as a unit toward and away from the drag cup when the mounting screws are loose, and then may be clamped securely in any selected position.

To increase the speed at which the switch 27 will be actuated, the bracket 49 is shifted toward the cup 35, to the left in FIG. 4, to shorten the length of the operating lever between the cup and the pivot 42 and reduce the mechanical advantage whereby a greater force on the cup is required to overcome the resistance exerted by the spring. To lower the changeover speed, the bracket is adjusted away from the cup, thereby increasing the effective length of the operating lever and reducing the drag force required to overcome the spring resistance. The space within the cup inside the aperture 43 accommodates the variable length of the lever that projects into the cup.

When the motor 10 attains the selected speed and the drag force exerted on the cup 35 by the magnet 34 overcomes the spring resistance, the resulting movement of the operating lever 41 acts through the actuating button 44 to shift the switch arm 27a from the contact 25 to the alternate contact 24 and thereby apply the source voltage to the full winding 16 through lines L1 and L2. This shifts the motor from the starting-current curve 30 in FIG. 5 to the running-current curve 29, and also from the starting-speed curve 32 to the running-speed curve 31, as indicated by the transition line 53 in FIG. 5. Thus, the current drops back within the safe steady-state range for which the motor is rated and the torque drops back into the normal torque range of the motor.

It should be emphasized that heat will be generated by the motor 10 during starting at a rate that is considered excessive for steady-state operation, but that the limited duration of such heating prevents the temperature of the components from rising to a dangerous level. In some instances, it may be desirable to add cooling means such as a fan 54 (FIG. 2) to assist in the dissipation of the generated heat. This is a simple and inexpensive expedient, since the fan adds little to the load on the motor and may be mounted directly on the motor shaft 12. Positive control on the temperature level may be obtained by using a thermally-actuated switch in place of the speed-responsive switch 27, but one problem with such switches is the time delay between actuation and resetting as a result of the required cooling time. Accordingly, the speed-responsive form is preferred for its positive reset characteristic where there is a possibility of repeated start-stop cycles in service use.

Figure 6:
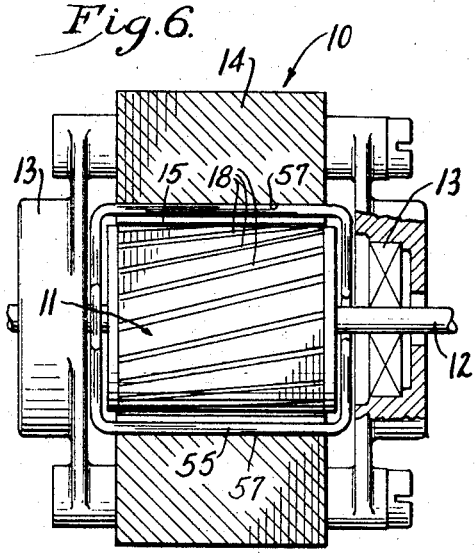
FIG. 6 is a cross section taken substantially in a plane parallel to the axis of the rotor of a motor embodying a modified form of the invention.
Figure 7:
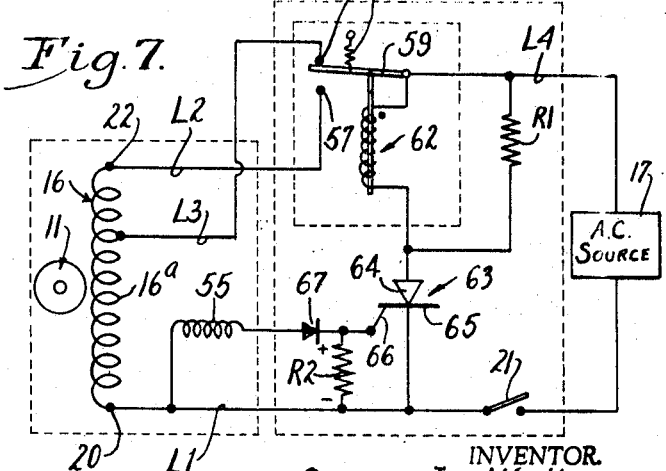
FIG. 7 is a schematic wiring diagram of the control circuitry for the modified form.

Description of alternate control, FIGS. 6 and 7

An alternate form of speed-sensing device is shown in FIGS. 6 and 7 for accomplishing the changeover from the starting condition to the running condition with electrical components rather than with the drag cup operator 33. The basic components of the motor 10 remain the same and are indicated by the same reference numbers, the differences being primarily in the control circuitry shown in FIG. 7.

In this instance, an auxiliary coil or winding 55 is placed in slots 57 in the stator 14, adjacent the air gap, as shown in FIG 6, with its axis in quadrature with the axis of the motor. During acceleration of the motor from a stalled condition to running speed, it has been found that the A.C. voltage induced in this winding grows progressively in amplitude, increasing as a function of speed by several hundred percent and undergoing a ninety degree phase shift as the motor accelerates from low speed to full speed. Thus, this winding produces a voltage signal that varies in amplitude with the motor's speed and may be utilized to initiate the change-over from one operating condition to another at a selected motor speed.

As before, the primary winding 16 (see FIG. 7) is tapped by an intermediate line L3 between the two lines L1 and L2 connected to the ends 20, 22 of the winding, and one line L1 is connected to the source through the start switch 21. The other two lines are connected to the two contacts 57 and 58 of a two-position switch having an arm 59 held by a spring 60 against the contact 58, thus completing a circuit through the switch arm from power line L4 to the tap line L3 and thence through the partial winding 16a to the line L1 to apply the source voltage to the partial winding. The switch arm is connected to a normally deenergized A.C. relay 62 wired in parallel with a damping resistor R1 across the power lines L1 and L4 and in series with a triggered electronic valve 63 for energizing the relay in response to a voltage signal of preselected amplitude in the sensing winding 55. Herein, the valve is a silicon-controlled rectifier (SCR) having its anode 64 connected to the parallel combination of the relay and resistor, its cathode 65 connected to the line L1, and its gate 66 connected through a silicon diode 67 to one end of the sensing coil 55, the other end of the coil being connected to the line L1. The diode protects the SCR against the application of negative voltage signals to the gate and also cooperates with a resistor R2 shunted from the gate to the cathode to form, in effect, a voltage divider for applying a selected fraction of the voltage signal generated by the auxiliary coil 55 to the gate 66.

With this arrangement, the diode and the SCR may be selected to maintain the latter in its nonconductive state while the motor is below a selected speed and the coil 55 is producing a voltage signal at the gate 66 of lower amplitude than that required to trigger the SCR. Thus, the relay 62 remains in the deenergized condition with the switch arm 59 positioned as shown in FIG. 8 during the initial acceleration and so long as the progressively increasing voltage signal produced by the coil during acceleration is below the selected value corresponding to the speed at which the motor is to be shifted to the running condition. When this voltage is attained, the corresponding positive voltage applied across the gate-cathode path of the SCR triggers the latter into the conductive state to conduct current across its anode-cathode path, between lines L1 and L4, for a portion of each positive half cycle, thereby energizing the relay with pulses of current.

When energized, the relay 62 pulls the switch arm 59 away from the contact 58 and into engagement with the alternate contact 57 to change the source voltage from he partial winding 16ª to the full winding 16, as before, thereby reducing the exciting current to the normal level and holding the switch arm in the running position so long as the motor speed is above the selected changeover speed and the start switch 21 is closed. For a motor with a normal running speed of about 3500 r.p.m., a representative changeover speed with either operator will be on the order of 1500–2000 r.p.m. which is attained in a short period of time such as three to four seconds, depending, of course, upon the size of the load and the starting torque of the particular motor.

From the foregoing, it will be evident that the method and both illustrative embodiments constituting the invention produce increased starting torque in a shaded-pole motor of given size by temporarily applying the source voltage to only part of the primary winding 16 and thereby creating a starting current greater than the normal, safe-rated current level of the motor. This enables the motor to overcome an initial load resistance higher than the running load the motor must drive, and permits the use of a smaller motor than otherwise would be required.

I claim as my invention:

1. In combination with a shaded-pole electric motor having a primary winding formed with a preselected number of turns and rated to carry a predetermined level of current in safe steady-state operation when connected to a voltage source of preselected value, the improvement comprising a starting control adapted for connection to said voltage source and having a switch movable between first and second positions, means operable when said switch is in said position to connect said voltage source across a portion of said winding less than said preselected number and to isolate the remainder of said winding from said voltage source thereby to produce a starting current higher than said predetermined level in said one portion of said winding while creating no exciting current in the remainder of the winding, means operable when said switch is in said second position to connect said voltage source across the full winding to produce current therein at said predetermined level, means yieldably holding said switch in said first position during starting whereby the motor initially is accelerated with said starting current, and an operator responsive to the progressive increase in the speed of the motor as the latter accelerates from a stall toward full speed and operable at a preselected speed level to shift said switch to said second position and thereby reduce the current for continued operation at said safe steady-state level.

2. The combination defined in claim 1 in which said operator comprises a lever pivoted on said motor and having a free end portion engaging said switch, a spring holding said switch in said first position and yieldable in response to an actuating force acting in one direction on said lever to permit the switch to move to said second position, a disk-shaped magnet coaxially mounted on the output shaft of said motor, a cup composed of nonmagnetic material telescoped over said magnet to be intersected by the flux lines surrounding the magnet as the latter rotates with said shaft, and means supporting said cup on said motor for rotation relative to said magnet and the motor whereby rotation of the magnet within the cup tends to rotate the cup with a force related to the speed of the motor, said cup abutting against said lever to move said switch to said second position when the drag force transmitted to said lever through said cup is sufficient to overcome the force of said spring.

3. The combination defined in claim 2 further including means supporting said switch and said lever on said motor for selective adjustment toward and away from said cup, longitudinally of said lever, said free end portion projecting into an opening in said cup whereby said adjustment varies the effective length of said lever to change the speed at which said switch is moved to said second position.

4. In combination with a shaded-pole electric motor having an exciting winding formed with a preselected number of turns and rated to carry a predetermined safe level of current in steady-state operation when connected to a source of voltage of preselected value, a starting control for increasing the starting torque obtained with said source voltage and comprising circuit means having switching means for connecting said source voltage alternatively to said preselected number of turns to energize the motor in a running condition and to a lesser number of said turns to energize the motor in a starting condition, said circuit means isolating the remaining turns of said winding from said source voltage and leaving said remaining turns unexcited when said source voltage is connected to said lesser number of turns, said lesser number being selected to produce a starting current higher than said safe level with said source voltage, and means responsive to the speed of said motor during acceleration from zero to a preselected intermediate speed in said starting condition and operable automatically in response to attainment of said speed to operate said switching means and energize said motor in said running condition.

5. The combination defined in claim 4 in which said switching means comprises a tap for said winding and a two-postion switch operable to apply said voltage across said tap in a first position and across the full winding in a second position, said speed-responsive means holding said switch in said first position while said motor is below said intermediate speed and in said second position above said intermediate speed.

6. The combination defined in claim 4 in which said speed-responsive means comprise a permanent magnet rotated by said motor, a member composed of nonmagnetic material movably positioned alongside said magnet to intersect the flux lines surrounding the magnet whereby eddy currents are set up in said member and interact with said flux lines to produce a force generally proportional to the speed of said motor urging the member in one direction with a preselected force less than the force applied to said member at said intermediate speed, and connecting means for transmitting movement of said member at said intermediate speed to said switching means to shift said switch from said first position to said second position.

7. The combination defined in claim 6 in which said permanent magnet is mounted on the output shaft of said motor and said member is a cup telescoped onto said shaft around said magnet, said cup being supported for rotation relative to said shaft and said motor.

8. The combination defined in claim 7 in which said resisting means is a spring acting on said cup through said switching means and said connecting means.

9. The combination defined in claim 4 in which said speed-responsive means includes an auxiliary winding in said motor for producing an induced voltage signal varying in magnitude in accordance with the speed of the motor, and means actuated by said signal at said intermediate speed and operating said switching means to change the motor to said running condition.

10. The combination defined in claim 9 in which said last-mentioned means includes a triggered electronic valve actuated by said signal when the latter attains a preselected magnitude, said switching means including a relay operable when energized to change said motor from the starting condition to the running condition.

11. The combination defined in claim 10 in which said valve is a silicon-controlled rectifier with its anode-cathode path in series with said relay and having a gate connected to said auxiliary winding to trigger the SCR at said intermediate speed.

12. In combination with a shaded-pole electric motor having an exciting winding formed with a preselected number of turns and rated to carry a predetermined safe level of current in steady-state operation when connected to a source of voltage of preselected value, said motor having terminals for connection to said source, the improvement comprising a starting control having switching means for connecting said voltage source alternatively across said preselected number of turns to energize the motor in a running condition and across a lesser number of turns to energize the motor in a starting condition with a starting current higher than said safe level, said switching means, when connecting said voltage source to said lesser number of turns, isolating the voltage source from the remaining turns and leaving the latter in an unexcited condition, an operator for said switching means controlling the latter to energize said motor in said starting condition and operable when actuated to change to said running condition, a triggered electronic valve controlling the energization of said operator and having a voltage-responsive input element for actuating the operator when a voltage signal of preselected amplitude is applied, and a sensing coil disposed in the stator of said motor around the rotor thereof and connected at one end to one of said terminals, said coil being connected at the other end to said input element thereby applying to the latter a voltage signal of progressively increasing amplitude as the motor accelerates from a start to a running speed and actuating said operator when said signal attains an amplitude corresponding to a selected speed.

13. The combination defined in claim 12 in which said operator is a relay operable when energized to shift from starting condition to running condition, and said valve is a silicon-controlled rectifier having its anode-cathode path in series with said relay and its gate connected to said coil.

14. The combination defined in claim 12 further including means forming a voltage divider for applying a preselected fractional part of said signal to said gate and thereby selecting the amplitude of signal for triggering said rectifier.

15. The method of starting and accelerating a shaded-pole electric motor having an exciting winding with a predetermined number of turns and an established safe steady-state current level produced by a predetermined source voltage, said method comprising the steps of, initially applying said predetermined voltage only to a portion of the winding having a number of turns less than said predetermined number while isolating said voltage from the remainder of said winding and thereby producing a starting current higher than said safe steady-state level to start and begin accelerating said motor with a substantially higher torque than would be obtained with the full winding, sensing the increasing speed of the motor during acceleration, and switching said voltage to the full winding when said motor attains an intermediate speed between zero and full speed and before the temporary starting current can damage the motor.

References Cited

UNITED STATES PATENTS

| | | | |
|---|---|---|---|
| 2,705,770 | 4/1955 | Suhr | 318—225 XR |
| 3,325,712 | 6/1967 | Stone et al. | 318—225 XR |

ORIS L. RADER, Primary Examiner

G. Z. RUBINSON, Assistant Examiner

U.S. Cl. X.R.

318—225